US012783185B2

(12) United States Patent
Onogi

(10) Patent No.: US 12,783,185 B2
(45) Date of Patent: Nov. 3, 2026

(54) IMAGE FORMING APPARATUS

(71) Applicant: SHARP KABUSHIKI KAISHA, Sakai City (JP)

(72) Inventor: Kenji Onogi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 226 days.

(21) Appl. No.: 18/882,553

(22) Filed: Sep. 11, 2024

(65) Prior Publication Data

US 2025/0085905 A1 Mar. 13, 2025

(30) Foreign Application Priority Data

Sep. 11, 2023 (JP) ................................ 2023-147051

(51) Int. Cl.
*G06F 3/12* (2006.01)

(52) U.S. Cl.
CPC .......... *G06F 3/1221* (2013.01); *G06F 3/1229* (2013.01); *G06F 3/1267* (2013.01); *G06F 3/1285* (2013.01)

(58) Field of Classification Search
CPC .... G06F 3/1221; G06F 3/1229; G06F 3/1267; G06F 3/1285
See application file for complete search history.

(56) References Cited

U.S. PATENT DOCUMENTS

| | | | | |
|---|---|---|---|---|
| 2007/0014586 | A1 | 1/2007 | Kobayashi | |
| 2010/0293400 | A1* | 11/2010 | Kuroishi | G06F 3/1285 713/310 |
| 2012/0262751 | A1 | 10/2012 | Inaba et al. | |
| 2020/0285920 | A1* | 9/2020 | Yamakawa | G06F 1/3206 |

FOREIGN PATENT DOCUMENTS

| | | |
|---|---|---|
| JP | 2007-043665 A | 2/2007 |
| JP | 2012-222753 A | 11/2012 |

OTHER PUBLICATIONS

InnovationQ+ by IP.com and IEEE, Results Publication Date Range: Nov. 17, 2004 to Mar. 24, 2025.*

* cited by examiner

*Primary Examiner* — Quang N Vo
(74) *Attorney, Agent, or Firm* — ScienBiziP, P.C.

(57) ABSTRACT

An image forming apparatus comprises a controller referring to a service setting storage before shifting to a power-saving state, when a request related to a start of an automatic printing-unnecessary service that is a predetermined service that does not start printing in response to the reception of the request is set not to be received in at least the power-saving state, adding a first type attribute to a pattern corresponding to a predetermined return packet and registering the pattern in the communicator, adding a second type attribute to a pattern related to another return packet and registering the pattern, and, when a request related to a start of any automatic printing-unnecessary service is set to be received, adding the second type attribute to a pattern related to any of the return packets and registering the pattern.

5 Claims, 9 Drawing Sheets

IMAGE FORMING APPARATUS

CROSS-REFERENCE TO RELATED APPLICATION

The present application claims priority from Japanese Application JP2023-147051, the content of which is hereby incorporated by reference into this application.

BACKGROUND

1. Field

The present disclosure relates to an image forming apparatus that, when a communication packet is received in a power-saving state, determines whether to cancel the power-saving state of an engine for printing.

2. Description of the Background Art

There has been proposed an image forming apparatus capable of preventing unnecessary initializing processing of an electrophotographic process from being performed when a return factor from a power-saving mode (power-saving state) to a normal mode (normal state) occurs. For example, the image forming apparatus includes a return factor monitor that monitors the presence or absence of occurrence of the return factor to the normal mode during the power-saving mode. When detecting occurrence of the return factor to the normal mode during the power-saving mode, the return factor monitor outputs a notification signal indicating information on the detected return factor to an image forming controller before start-up of a system controller is completed. Furthermore, the image forming apparatus includes an initialization necessity determiner that determines the necessity of the initialization of the predetermined process at the time of returning to the normal mode, on the basis of the return factor information indicated by the notification signal.

Another image forming apparatus as described below has also been proposed. The image forming apparatus has a determiner that determines, when a job is received in a sleep state, a port number of the received job, and a discriminator that discriminates, on the basis of the port number determined by the determiner, whether initializing processing of an image former is necessary. Furthermore, the image forming apparatus has a start-up controller that controls such that, when the initializing processing of the image former is discriminated to be necessary by the discriminator, processing of the job by a controller is started after the initializing processing of the image former is started.

SUMMARY

In the former image forming apparatus, in addition to data reception from a plurality of external I/Fs, a plurality of return factors such as a document placement detection sensor, a pressure plate open/close detection sensor, and a power supply operation switch are notified to an engine controller using a plurality of notification signals assigned as different codes by an ASIC of the system controller. Alternatively, since the notification is performed using a pulse-width-modulation signal, processing and exchange of the notification signal are complicated. In the latter image forming apparatus, even when a port number of a job sent to the image forming apparatus indicates a print job, in a case of a print job related to a service that does not involve printing, such as reservation printing or printing in which the print job is stored as a print server and is output to another image forming apparatus, an engine is wastefully initialized.

The present disclosure has been made in view of the circumstances as described above, and provides an image forming apparatus capable of implementing, with a simple hardware configuration, a configuration in which a power-saving state of an engine is not wastefully canceled when a communication packet is received from an external device.

The present disclosure provides an image forming apparatus including: a service setting storage that stores a setting related to at least one service requested from an external device; a communicator that determines, when a communication packet is received in a power-saving state, whether the communication packet is a return packet requiring cancellation of the power-saving state; a controller that, when the communication packet is the return packet, receives a request related to a start of the service, which is received by communication including a subsequent packet, and executes processing; an engine that performs printing in accordance with an instruction from the controller; and a power supply that individually turns on and off power to be supplied to the controller and the engine, in which the controller refers to the service setting storage before shifting to the power-saving state, when a request related to a start of an automatic printing-unnecessary service that is a predetermined service that does not start printing in response to the reception of the request is set not to be received in at least the power-saving state, adds a first type attribute to a pattern corresponding to a predetermined return packet and registers the pattern in the communicator, adds a second type attribute to a pattern related to another return packet and registers the pattern, and, when a request related to a start of any automatic printing-unnecessary service is set to be received, adds the second type attribute to a pattern related to any of the return packets and registers the pattern, and the communicator causes the power supply to turn on the power to the controller when the communication packet received in the power-saving state is the return packet, and sets a predetermined signal when the return packet corresponds to the first type pattern, and the controller whose power is turned on causes the power supply to turn on the power to the engine when the predetermined signal is set.

Moreover, the present disclosure provides an image forming apparatus including: a service setting storage that stores a setting related to at least one service requested from an external device; a communicator that determines, when a communication packet is received in a power-saving state, whether the communication packet is a return packet requiring cancellation of the power-saving state; a controller that, when the communication packet is the return packet, receives a request related to a start of the service, which is received by communication including a subsequent packet, and executes processing; an engine that performs printing; and a power supply that individually turns on and off power to be supplied to the controller and the engine, in which the communicator causes the power supply to turn on the power to the controller when the communication packet received in the power-saving state is the return packet, and sets a predetermined signal when the return packet corresponds to a predetermined pattern, and the controller whose power is turned on refers to the service setting storage when the predetermined signal is set, and causes the power supply to turn on the power to the engine when a request related to a start of an automatic printing-unnecessary service that is a predetermined service that does not start printing in response to the reception of the request is set not to be received.

In the image forming apparatus according to the present disclosure, the controller refers to the service setting storage before shifting to a power-saving state, and, when a request related to a start of an automatic printing-unnecessary service is set not to be received in at least the power-saving state, adds a first type attribute to a pattern corresponding to a predetermined return packet and registers the pattern in the communicator. The communicator turns on power to the controller when a communication packet received in the power-saving state is a return packet, and sets a predetermined signal when the return packet corresponds to the first type pattern. The controller whose power is turned on turns on power to the engine when the predetermined signal is set. Therefore, the power-saving state of the engine can be prevented from being wastefully canceled with a simple hardware configuration.

DESCRIPTION OF EMBODIMENTS

Figure 1:
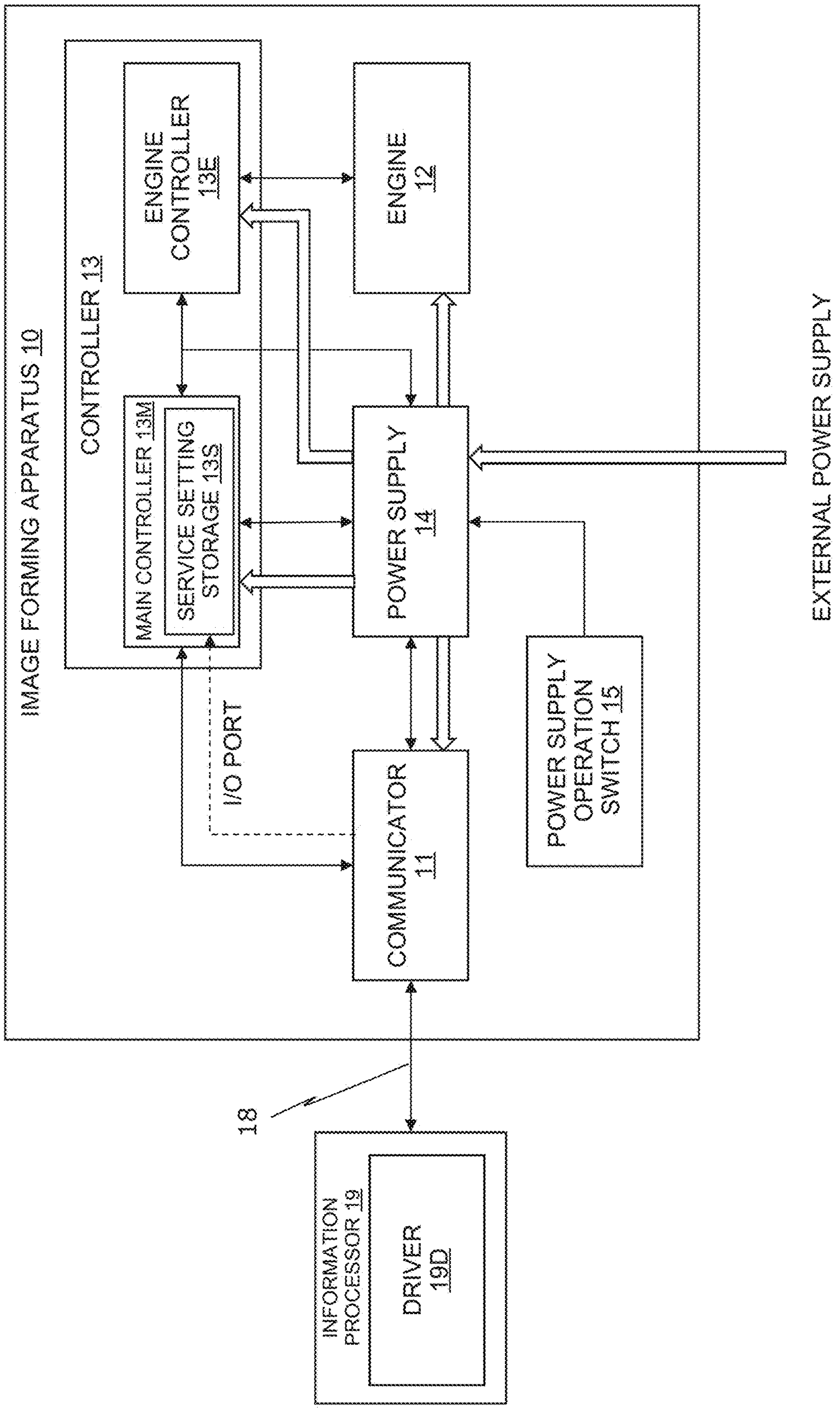
FIG. 1 is a block diagram illustrating a configuration example of an image forming apparatus related to cancellation of a power-saving state by reception of a communication packet in an embodiment of the present disclosure.

The present disclosure will be described in more detail with reference to the drawings. The following description is illustrative in all respects and should not be construed as limiting the present disclosure. First, an image forming apparatus according to the present disclosure will be described. FIG. 1 is a block diagram illustrating a configuration example of an image forming apparatus related to cancellation of a power-saving state by reception of a communication packet in an embodiment of the present disclosure. As illustrated in FIG. 1, an image forming apparatus 10 includes a communicator 11, an engine 12, a controller 13, a power supply 14, and a power supply operation switch 15. The communicator 11 is a communication control circuit for communicating with an external device to which the image forming apparatus 10 is connected via a network 18. Processing at a network level is executed for a communication packet received via the network 18. When being applied to the OSI reference model, the processing mainly corresponds to the levels of the data link layer (second layer) and the network layer (third layer). FIG. 1 also illustrates an image forming system in which an information processor 19 in which a driver 19D is installed is connected to the image forming apparatus 10 via the network 18. The information processor 19 is, for example, a personal computer or a smartphone, but is not limited thereto. The information processor 19 is only required to, with the driver 19D installed, give an instruction related to a print job to the image forming apparatus 10 via the network 18. In addition, the information processor 19 can also request the start of various services which do not involve printing via the network 18 by software (not illustrated).

The engine 12 is a mechanism and a circuit that perform image formation, and performs image formation by, for example, an electrophotographic or inkjet printing method. Since the engine 12 consumes a large amount of power to operate the circuit and the mechanism, in the present embodiment, the power to the engine 12 is turned off in a power-saving state. An initializing process (so-called warm-up) needs to be performed from when the power-saving state is canceled and power is supplied to the engine 12 until the engine 12 reaches a printable state, and a certain amount of time is required from the start to the end of the warm-up. The time is, for example, 20 seconds.

The controller 13 controls each component of the image forming apparatus 10 including the engine 12. The controller 13 is a circuit mainly including a processor, a memory, and an I/O port as a hardware configuration. A program stored in the memory is executed by the processor, so that processing as the controller 13 is executed. In other words, the function of a controller is implemented by organically combining software and hardware. FIG. 1 illustrates a mode in which the controller 13 includes an engine controller 13E that controls the engine 12 and a main controller 13M that controls other components including the communicator 11. The mode indicates that the engine controller 13E and the main controller 13M each have their own hardware. The main controller 13M and the engine controller 13E control the image forming apparatus 10 in cooperation with each other while communicating with each other. The main controller 13M has, in addition to a read only memory (ROM) and a random access memory (RAM) as memories, a non-volatile memory as a service setting storage 13S that stores a setting related to at least one service requested from an external device. The service setting storage 13S stores various settings related to a user interface and a print job of the image forming apparatus 10, including the setting related to at least one service requested from an external device, such that the processor of the main controller 13M can read and write the settings. In addition to or instead of the non-volatile memory as the service setting storage 13S, the service setting storage 13S may have a storage such as a hard disk drive (HDD) or a solid state drive (SSD). The main controller 13M controls the operation of the image forming apparatus 10 on the basis of a user's operation on the image forming apparatus 10 received via an operation unit (not illustrated in FIG. 1) and communication with an external device performed by the communicator 11 via the network 18. The engine controller 13E receives a request from the main controller 13M, controls the operation of the engine 12, and causes the engine 12 to execute a print job. In addition, the engine controller 13E controls on and off of the power to the engine 12 via the power supply 14.

The power supply 14 is a circuit that receives supply of AC power from a power system, converts the AC power into DC power, and supplies the DC power to each of the communicator 11, the engine 12, the main controller 13M, and the engine controller 13E. The power supply 14 can individually turn on and off power to the engine 12, the main controller 13M, and the engine controller 13E. When the image forming apparatus 10 is in a normal state, the power supply 14 supplies power to each of the communicator 11, the engine 12, the main controller 13M, and the engine controller 13E. When the main controller 13M gives an instruction regarding a shift from the normal state to the power-saving state, the power supply 14 turns off the power to the engine 12, the main controller 13M, and the engine controller 13E on the basis of the instruction to suppress the power consumption. The power is supplied to the communicator 11 even in the power-saving state. This is because the communicator 11 is made to be able to receive a communication packet from an external device via the network 18.

The power supply operation switch 15 is a switch circuit arranged in the operation unit of the image forming apparatus 10. When the user operates the power supply operation switch 15 while the image forming apparatus 10 is in the power-saving state, the power supply 14 turns on power to the main controller 13M and the engine controller 13E in response to the operation. When the main controller 13M, which has been supplied with power and started processing, instructs the engine controller 13E to start warm-up, and in response to the instruction, the engine controller 13E instructs the power supply 14 to turn on power to the engine 12, the power supply 14 turns on power to the engine 12. The engine 12 executes warm-up and shifts to an image formable state. Therefore, in the present embodiment, a trigger for returning the image forming apparatus 10 from the power-saving state to the normal state is reception of a communication packet via the network 18 or an operation of the power supply operation switch 15. A trigger related to the features of the present disclosure among the triggers is reception of a communication packet via the network 18. Solid arrows illustrated in FIG. 1 indicate communication and control signals inside the image forming apparatus 10. A dashed arrow indicates an I/O port that the communicator 11 asserts such that the main controller 13M whose power-saving state has been canceled and whose power has been turned on executes predetermined processing. Open arrows indicate supply of power.

Processing of Communicator in Power-Saving State

Figure 2:
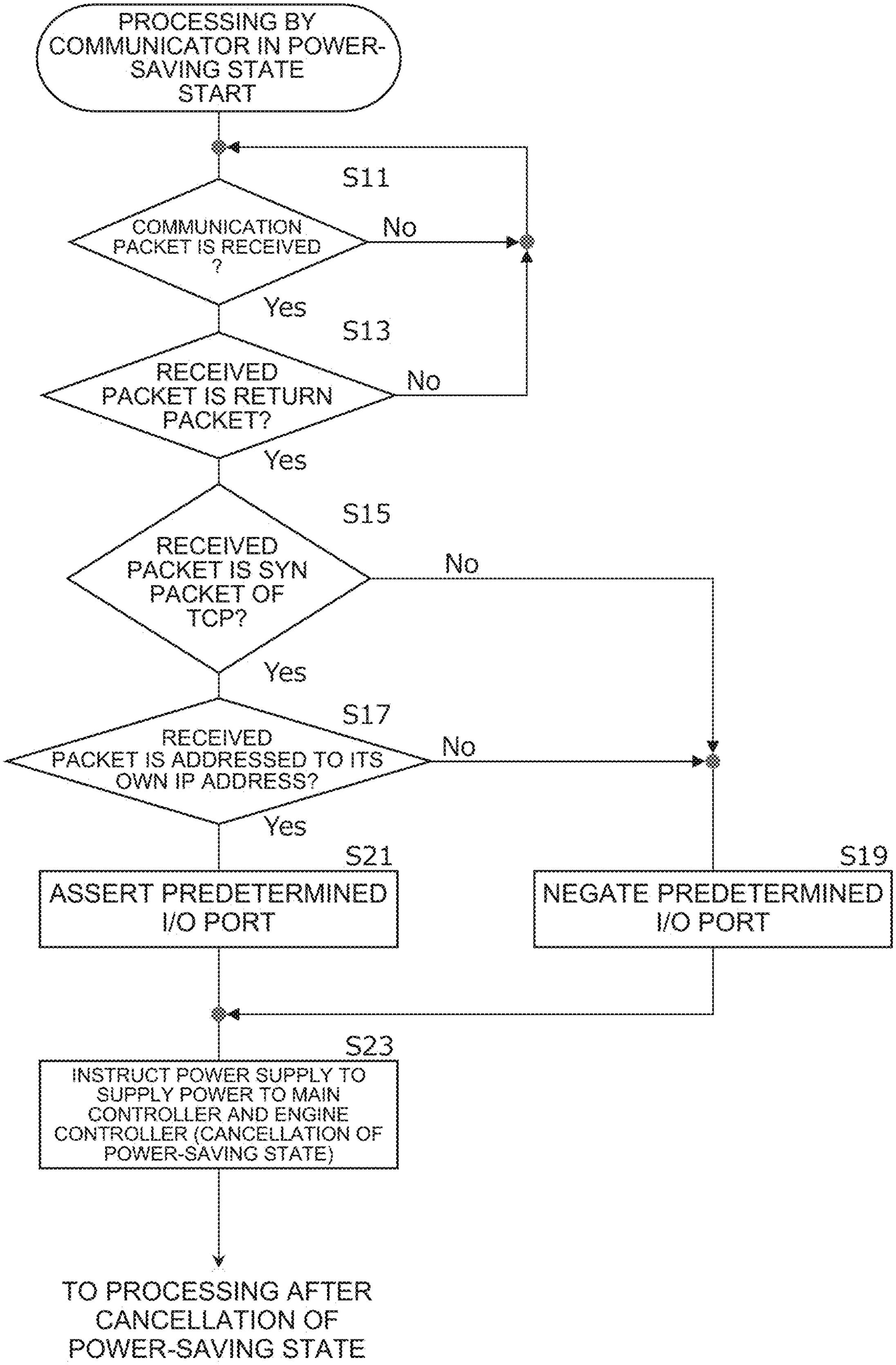
FIG. 2 is a flowchart illustrating an example of processing related to the cancellation of the power-saving state executed by a communicator in the power-saving state in the embodiment of the present disclosure.

Next, processing related to the cancellation of the power-saving state executed by the communicator 11 in the power-saving state will be described. FIG. 2 is a flowchart illustrating an example of the processing related to the cancellation of the power-saving state executed by the communicator 11 in the power-saving state in the embodiment of the present disclosure. As illustrated in FIG. 2, the communicator 11 executes processing for a communication packet received via the network 18 in the power-saving state. When a communication packet is received (Yes in step S11), the communicator 11 determines whether the received communication packet (received packet) corresponds to a predetermined return packet pattern (step S13). The return packet is a packet in which at least a part of the content of the communication packet matches a predetermined pattern, and an example thereof is a magic packet defined as a packet that sends a power-on instruction to a device connected via a network. Another example is a packet that an information processor in which a driver is installed sends to the image forming apparatus in order to make a request related to the start of any one of the services. The return packet pattern may be a predetermined fixed pattern, or may be registered in the communicator 11 by the main controller 13M. Assuming that the former is a basic mode (first embodiment), the latter is a second embodiment. By registering the return pattern, when receiving a general magic packet that sends a power-on instruction via a network or when receiving a packet that requests execution of a service from a driver, the communicator 11 can turn on the power to the main controller 13M and cause the main controller 13M to determine processing to be performed. In addition, according to a mode of the second embodiment, the main controller 13M can register in advance, in the communicator 11, the pattern of the return packet that the driver sends to the image forming apparatus in order to cancel the power-saving state. In this way, by changing the return packet pattern to be registered in the communicator 11 by the main controller 13M in accordance with the service setting storage 13S or other situations, the condition for returning the image forming apparatus 10 from the power-saving state can be flexibly changed.

When the received packet does not correspond to the return packet pattern (No in step S13), the communicator 11 returns the processing to step S11 and waits for reception of a next communication packet without performing the processing related to the cancellation of the power-saving state. On the other hand, when the received packet corresponds to the return packet pattern (Yes in step S13), it is determined whether the received packet is a synchronize packet (SYN packet) of a transmission control protocol (TCP) (step S15). In the present embodiment, when the received packet is not a SYN packet of a TCP (No in step S15), a predetermined I/O port is negated (step S19). Then, the processing proceeds to step S23, which will be described below, and the power supply 14 is instructed to cancel the power-saving state. According to the present mode, the communicator 11 can cause the main controller 13M to determine whether to cancel the power-saving state of the engine 12 only when receiving a SYN packet for requesting the connection establishment addressed only to itself. When the received packet is a communication packet other than the above and is not a packet that requests execution of a service by an external device, the determination can be omitted.

Figure 3:
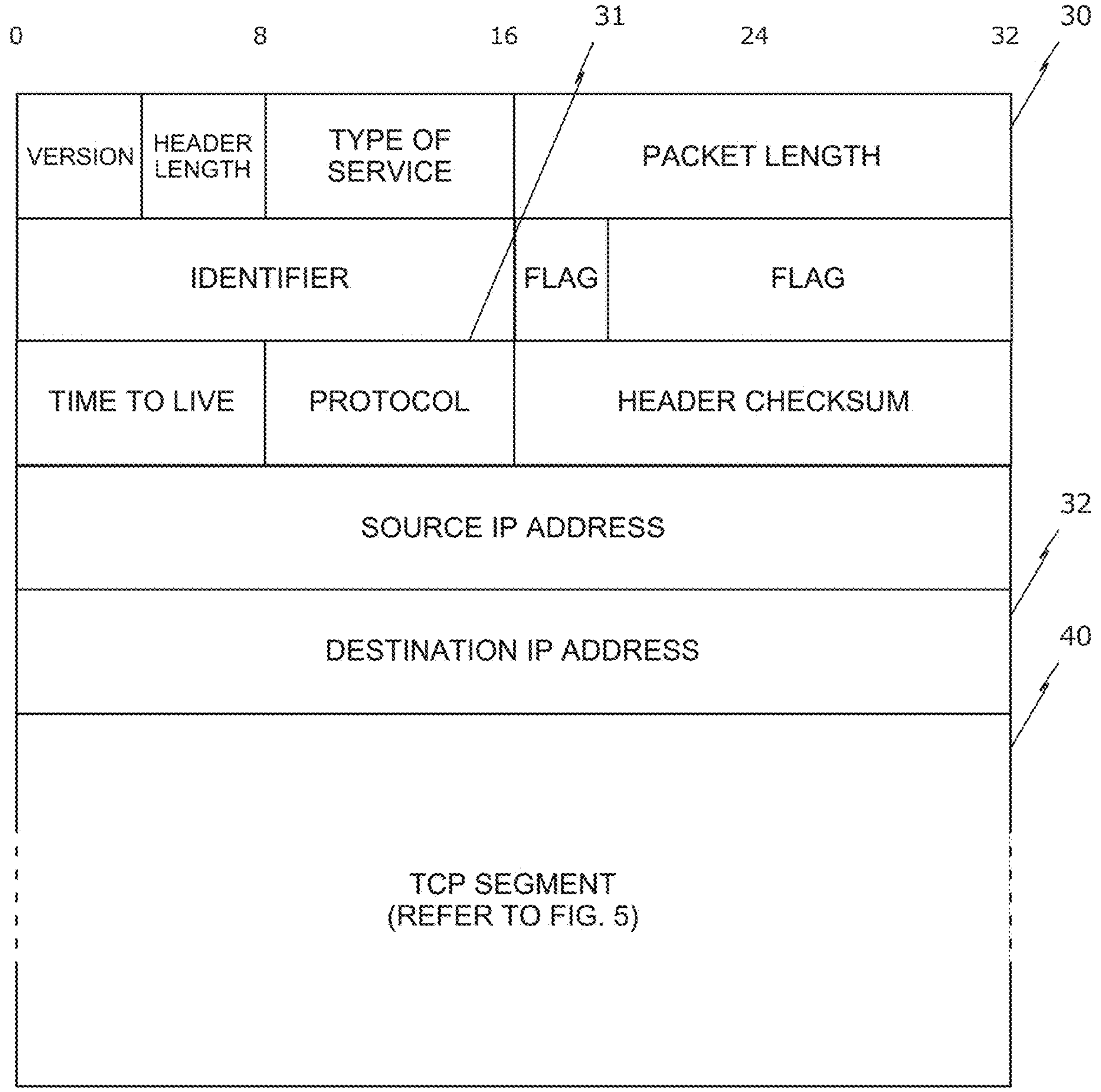
FIG. 3 is an explanatory diagram illustrating an example of a format of a communication packet determined by the communicator in the processing illustrated in FIG. 2.

On the other hand, when the received packet is a SYN packet of a TCP (Yes in step S15), subsequently, the communicator 11 determines whether the received packet is a unicast address addressed only to its own IP address (step S17). When the received packet is not a unicast address (No in step S17), the predetermined I/O port is negated (step S19). Then, the processing proceeds to step S23, which will be described below, and the power supply 14 is instructed to cancel the power-saving state. FIG. 3 is an explanatory diagram illustrating a packet format of IPv4 when TCP communication is performed as an upper layer of IPv4. In FIG. 3, the numbers 0, 8, 16, 24, and 32 shown above an IPv4 packet 30 illustrated by a rectangle indicate the number of bits. That is, a rectangle in one horizontal row corresponds to 32-bit communication data. Each of a plurality of columns arranged vertically is 32-bit communication data, and is transmitted in order from the top to the bottom. In the packet format illustrated in FIG. 3, a protocol 31, a destination IP address 32, and a TCP segment 40 are related to the present application. A packet in which the value of the protocol 31 is 0x06, that is, 6 in decimal, indicates TCP communication data. The determination is made in step S15. In addition, it is determined in step S17 whether the destination IP address 32 is a value unique to itself, that is, a unicast address addressed to itself. The details of the TCP segment 40 is illustrated in FIG. 4.

Figure 4:
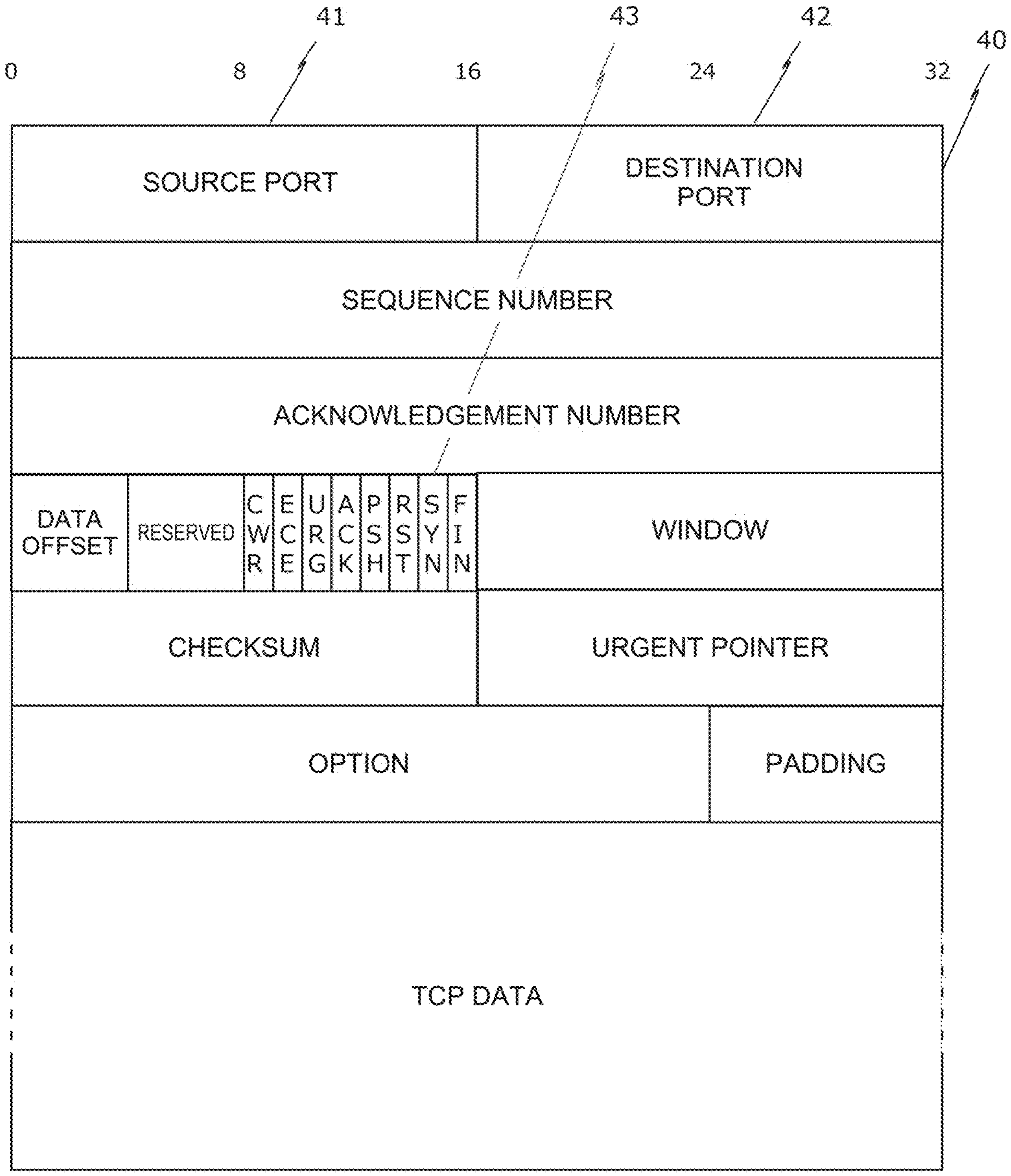
FIG. 4 is an explanatory diagram illustrating a TCP segment in the packet format illustrated in FIG. 3.

As illustrated in FIG. 4, the TCP segment 40 includes a source port 41 and a destination port 42 indicating source and destination port numbers, respectively. In the format of the TCP segment illustrated in FIG. 4, a SYN flag 43 is related to the present application. A state in which the SYN flag is set indicates a SYN packet of a TCP. The determination is made in step S15.

The description returns to the flowchart of FIG. 2. When it is determined in step S17 described above that the received packet is a unicast address addressed to its own IP address (Yes in step S17), it is determined that there is a possibility of requesting warm-up of the engine. In this case, the predetermined I/O port is asserted (step S21). According to the present mode, when the power of the main controller 13M is not turned on yet, the communicator 11 outputs a predetermined signal to the controller and holds the signal in advance, so that the main controller 13M can read the signal and know processing to be executed after the power-on. The processing is processing related to a service requested from an external device. Then, the power supply 14 is instructed to turn on the power to the main controller 13M and the engine controller 13E (that is, the controller 13). In other words, the power supply 14 is instructed to cancel the power-saving state (step S23). However, the power to the engine 12 is not turned on. The power to the engine 12 is turned on by the engine controller 13E.

After the power-saving state is canceled and the main controller 13M and the engine controller 13E start processing, the communicator 11 communicates with the information processor 19 and other devices connected via the network 18 under the control of the main controller 13M. Since the present disclosure relates to the cancellation of the power-saving state, a description of processing after instructing the power supply 14 to cancel the power-saving state will be omitted.

Processing of Controller after Cancellation of Power-Saving State (at Start-Up)

Figure 5:
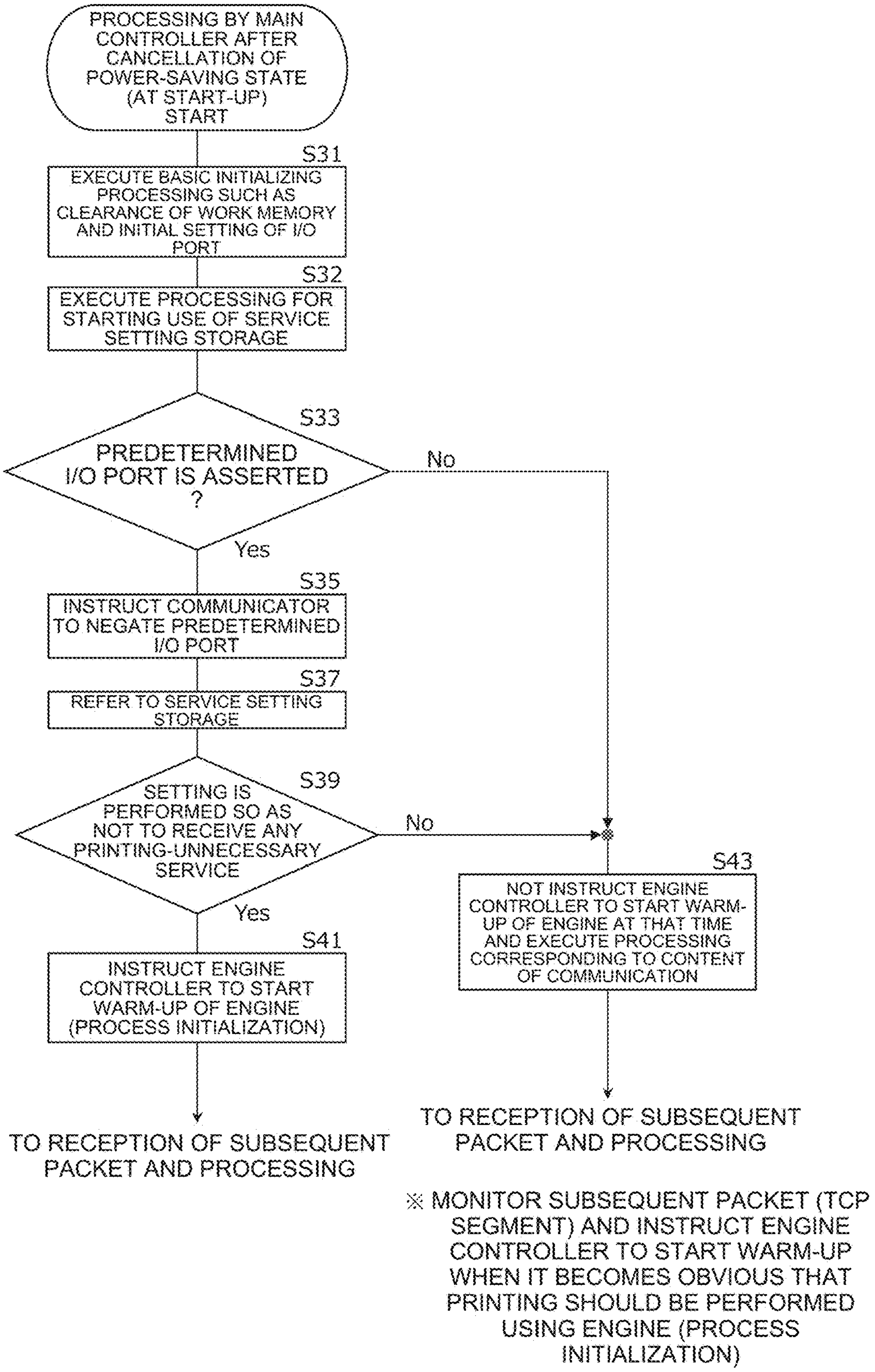
FIG. 5 is a flowchart illustrating initial processing executed by a controller when the power-saving state is canceled and power is supplied in the embodiment of the present disclosure.

Next, processing related to the power-on of the engine 12 by the controller 13 to which power is supplied by executing the processing of step S23 described above by the communicator 11 will be described. FIG. 5 is a flowchart illustrating processing executed by the controller 13 serving as the main controller 13M at start-up, in particular, processing related to the cancellation of the power-saving state. As illustrated in FIG. 5, when the power is turned on and the processing is started, the main controller 13M executes basic initializing processing such as clearance of a work memory and initialization of the I/O port (step S31). A basic initialization process in step S31 is executed before the subsequent processing related to the cancellation of the power saving state from step S32 onwards. In addition, the main controller 13M executes processing for starting the use of the service setting storage 13S (step S32). When the initializing processing and the preparation for the use of the service setting storage 13S are completed, the main controller 13M determines whether the communicator 11 asserts the predetermined I/O port. The I/O port is an output port of the communicator 11 and an input port of the main controller 13M.

When the predetermined I/O port is asserted (Yes in step S33), the main controller 13M instructs the communicator 11 to negate the predetermined I/O port (step S35). The instruction is transmitted to the communicator 11 using a communication line or a control line in the apparatus. Then, the main controller 13M refers to a setting related to a service requested from an external device, which is stored in the service setting storage 13S (step S37). The above-described service includes at least one of a reservation printing function, a function of using the image forming apparatus as a print server, and a function of using the image forming apparatus as a network storage. That is, the above-described service includes a service in which, when a request to execute (start) the service is received, printing is not started only in response to the reception of the request. Such a service is referred to as an automatic printing-unnecessary service in the present disclosure. However, even in the case of a service of a type in which printing is not started when a request related to the start (execution) of the service is received, a service that is substantially rarely used may be set to be excluded from the automatic printing-unnecessary service in advance. In this sense, it can be said that the automatic printing-unnecessary service is a predetermined service, and, when a request related to the start (execution) of the service is received, any service belonging to the automatic printing-unnecessary service does not start printing only in response to the reception of the request. On the other hand, the reverse is not necessarily true. That is, a service that is not the automatic printing-unnecessary service does not necessarily start printing in response to reception of a request related to the start (execution) of the service. Examples of the automatic printing-unnecessary service include a reservation printing service in which, when data related to a print job is received, the data is not simply output, but is stored and reserved in a memory, and printing is performed after a predetermined instruction is received. Alternatively, the examples include a service as a print server that, when data related to a print job is received, provides the data to another apparatus connected via communication. Furthermore, the examples include a service as a network storage.

When the service includes at least one automatic printing-unnecessary service, it is confirmed whether any one of predetermined automatic printing-unnecessary services is set to be received. When any service among the predetermined automatic printing-unnecessary services is set not to be received (Yes in step S39), the main controller 13M determines that the communicator 11 has asserted the predetermined I/O port, that is, there is a high possibility that the communication is related to a print job that needs to automatically start printing using the engine 12. Therefore, an instruction is sent to the engine controller 13E to start warm-up of the engine at that time in preparation for execution of the print job (step S41). In response to the instruction, the engine controller 13E instructs the power supply 14 to supply power to the engine 12. Accordingly, the warm-up of the engine 12 is started. In addition, the engine controller 13E executes processing for starting the use of the service setting storage 13S (step S42). Since subsequent processing of the main controller 13M is processing in the normal state, which is not related to the cancellation of the power-saving state, the description thereof will be omitted. According to the present mode, when any service among one or more predetermined automatic printing-unnecessary services that receive a start-related request from an external device is set not to be received, the warm-up can be started such that the engine 12 can execute the print job by determining that there is a high possibility that the request is related to a service that needs to automatically start printing. On the other hand, when the predetermined automatic printing-unnecessary services are set to be receivable, the main controller 13M can determine whether to start the warm-up of the engine in accordance with the content of communication including a subsequent communication packet.

In the determination of step S33 described above, when the predetermined I/O port is not asserted (No in step S33), the main controller 13M does not give an instruction to start the warm-up of the engine 12 at that time, and executes other processing corresponding to the content of the communication (step S43). This is because, when the communicator 11 negates the I/O port, the communication is unlikely to be related to the execution of the print job. In addition, the engine controller 13E executes processing for starting the use of the service setting storage 13S (step S45). When it is determined in step S39 described above that any one of the predetermined automatic printing-unnecessary services is set to be received (No in step S39), the processing also proceeds to step S43. This is because, when any one of the predetermined automatic printing-unnecessary services is set to be received, even when data related to a print job is received, the data is likely to be reserved without being printed. Even if the warm-up is started at this point of time, when the received data is merely reserved and printing is not performed, power is wastefully consumed. Therefore, subsequent communication is monitored, and an instruction is given to the engine controller 13E to start the warm-up at the time when the execution of the print job is ensured. According to the present mode, the main controller 13M refers to the service setting storage to determine whether any one of the predetermined automatic printing-unnecessary services is set to be received, and, when there is no possibility thereof, the warm-up of the engine 12 can be started at that time. When any one of the predetermined automatic printing-unnecessary services is set to be received, it is determined whether to execute the print job in accordance with the content of communication including a subsequent communication packet, so that the warm-up of the engine 12 can be prevented from being started wastefully due to a request for a service that does not need to automatically start printing.

Figure 6:
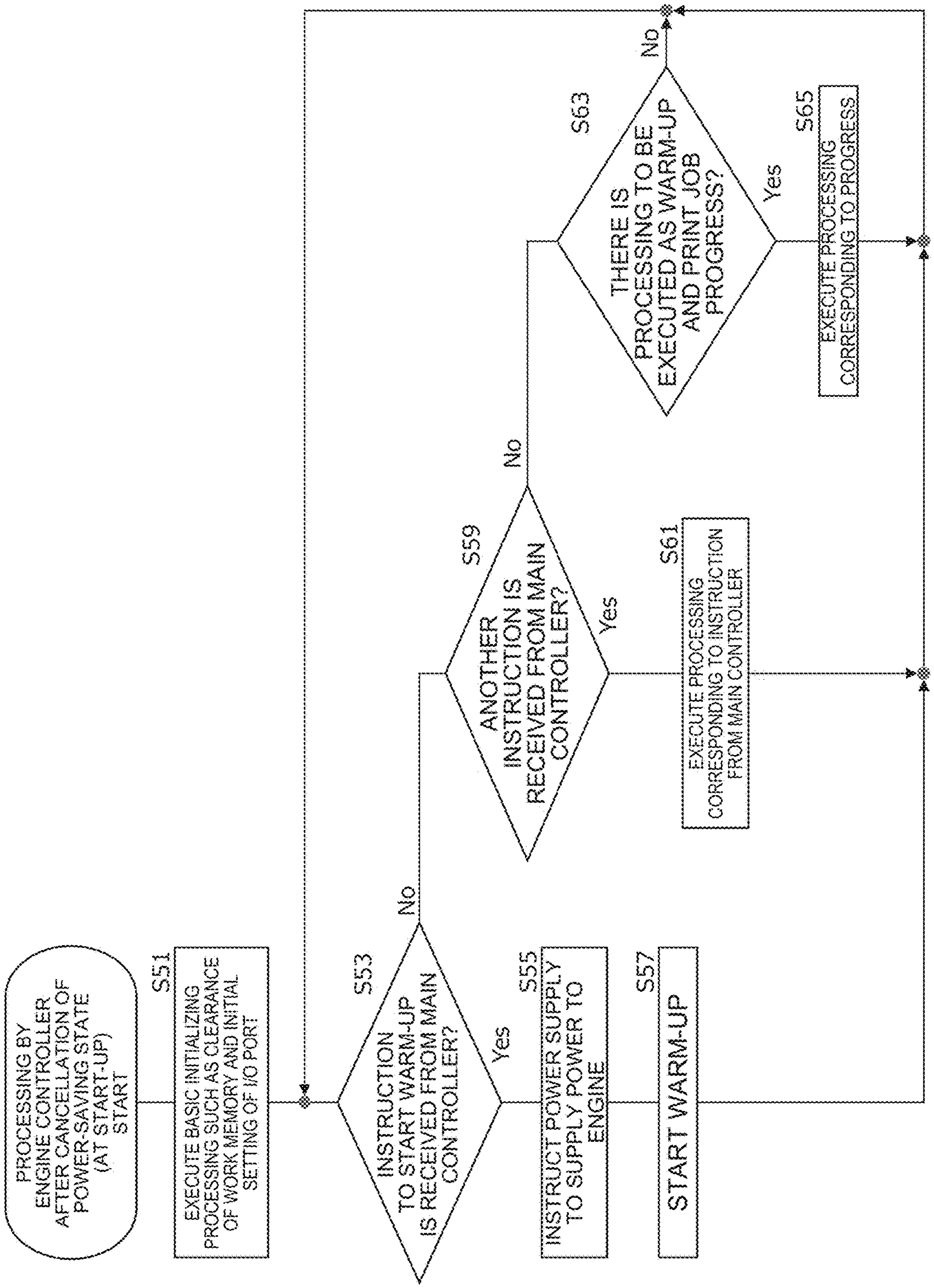
FIG. 6 is a flowchart illustrating initial processing executed by an engine controller when the power-saving state is canceled and power is supplied in the embodiment of the present disclosure.

FIG. 6 is a flowchart illustrating processing executed by the engine controller 13E at start-up, in particular, processing related to the cancellation of the power-saving state. As illustrated in FIG. 6, when the power is turned on and the processing is started, the engine controller 13E executes basic initializing processing such as clearance of a work memory and initialization of the I/O port in the same manner as the main controller 13M (step S51). Then, it is determined whether an instruction to start the warm-up is received from the main controller 13M (step S53). When an instruction to start the warm-up is received (Yes in step S53), the power supply 14 is instructed to supply power to the engine 12 (step S55). Then, the engine 12 is controlled to start the warm-up (step S57). In addition, when receiving another instruction from the main controller (Yes in step S59), the engine controller 13E executes processing corresponding to the instruction (step S61). When there is processing to be executed as the warm-up and the print job progress (Yes in step S63), processing corresponding to the progress is executed (step S65). As described above, the engine controller 13E executes processing corresponding to the situations by monitoring the start of the warm-up and another instruction from the main controller 13M, and monitoring the progress of the warm-up and the print job (a loop returning to step S53 via No in step S53, No in step S59, and No in step S63). In the present embodiment, the main controller 13M and the engine controller 13E of the controller 13 are individual pieces of hardware, and function as the controller 13 that controls the image forming apparatus 10 in cooperation with each other. This is referred to as the first embodiment. In contrast, a mode in which the main controller 13M and the engine controller 13E are integrated into one piece of hardware (the controller 13) is also possible. This is referred to as a third embodiment. In the case of the third embodiment, the flowcharts of FIGS. 5 and 6 are also integrated. That is, the controller 13 determines, when the I/O port is asserted, whether any one of the predetermined automatic printing-unnecessary services is set to be received, and instructs, when such a setting is not performed, the power supply 14 to supply power to the engine 12 at that time. When any one of the predetermined automatic printing-unnecessary services is set to be received, subsequent communication is monitored, and an instruction to supply power to the engine 12 is given at the time when the execution of the print job is ensured.

Fourth Embodiment

In the first to third embodiments, when the power-saving state is canceled and the image forming apparatus 10 is returned to the normal state, the controller 13 serving as the main controller 13M refers to the service setting storage 13S and determines the necessity of the warm-up of the engine 12. In the present embodiment, the controller 13 not only registers the return packet pattern in the communicator 11 as in the second embodiment, but also refers to the service setting storage 13S before shifting to the power-saving state and performs preprocessing for speeding up the processing after the power-saving state is canceled. Specifically, by performing the determination related to the necessity of the warm-up of the engine 12 after the cancellation of the power-saving state without referring to the service setting storage 13S, the warm-up can be started before the preparation for the use of the service setting storage 13S is completed. The details are as follows.

Processing Before Shift to Power-Saving State

Figure 7:
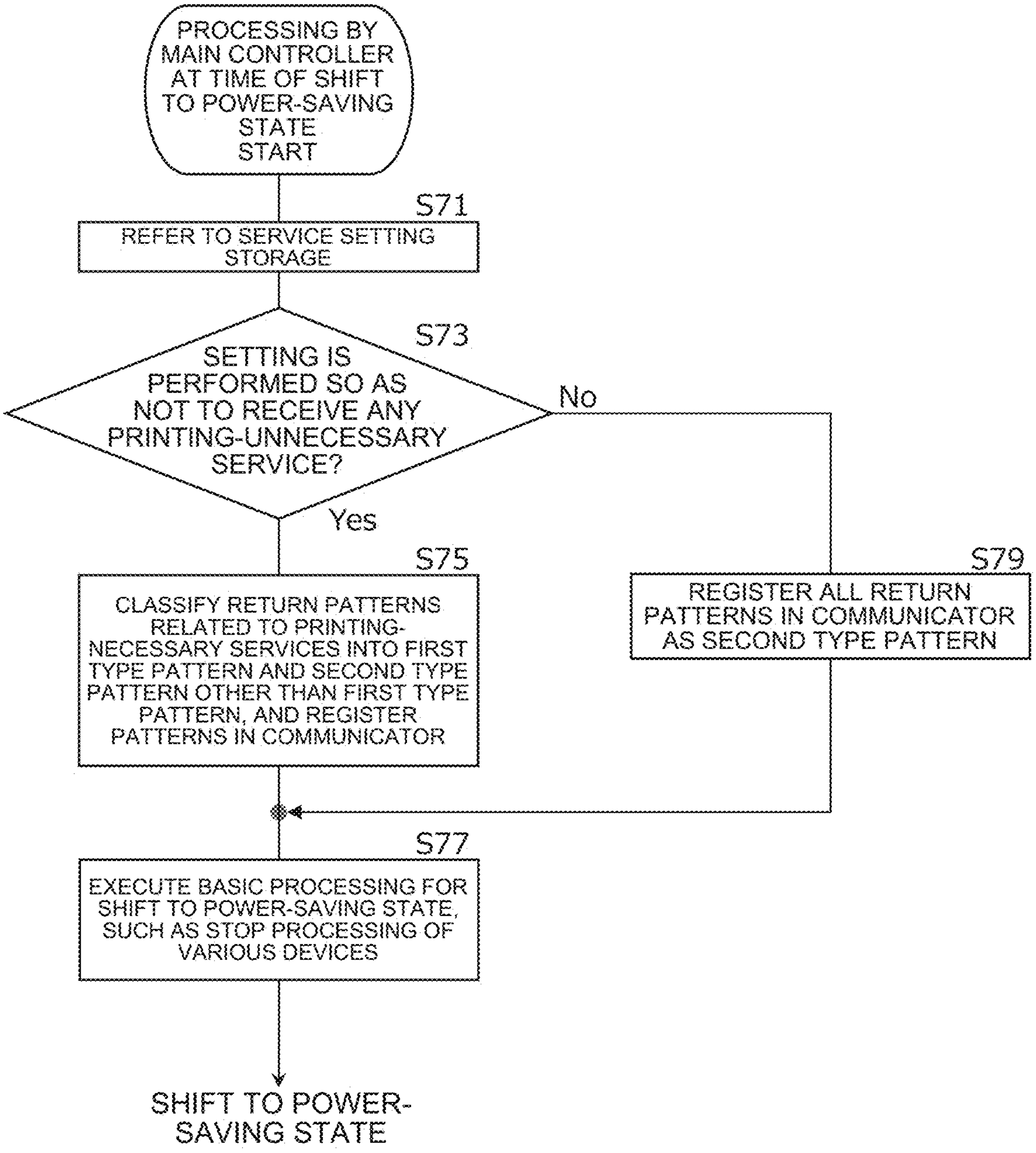
FIG. 7 is a flowchart illustrating an example of processing in which the controller registers a return pattern in the communicator at the time of a shift to the power-saving state in a fourth embodiment.

FIG. 7 is a flowchart illustrating an example of processing in which the controller 13 registers a return pattern in the communicator 11 at the time of a shift to the power-saving state in the present embodiment. The controller 13 executes the processing illustrated in FIG. 7 when shifting to the power-saving state. That is, return packet patterns are classified into a first type and a second type, and the first type and the second type are registered in the communicator 11 that receives a communication packet in the power-saving state. As can be understood from the processing after the cancellation of the power-saving state, which will be described below, as a result, the first type pattern starts the warm-up of the engine 12 early when a return packet matching the pattern is received. On the other hand, the second type pattern starts the warm-up after performing of printing using the engine 12 is ensured.

In FIG. 7, the controller 13 serving as the main controller 13M refers to the service setting storage 13S before shifting to the power-saving state (step S71). Then, it is determined whether any one of predetermined automatic printing-unnecessary services among one or more kinds of services to be executed in response to a request from an external device is set to be received (step S73). Examples of the automatic printing-unnecessary service include a service related to reservation printing in which, when data related to a print job is received, the data is stored and reserved in a memory, and printing is performed after a predetermined instruction is received. Moreover, the examples include a service that causes an image forming apparatus to function as a print server and another apparatus connected via communication to execute printing. Furthermore, the examples include a service that causes an image forming apparatus to function as a network storage. On the other hand, examples of a service that does not correspond to the automatic printing-unnecessary service include a service related to normal printing in which data related to a print job is received and printing is automatically started.

When all of the predetermined automatic printing-unnecessary services are set to be invalid (Yes in step S73), the controller 13 serving as the main controller 13M performs next processing. A pattern indicating the features of a head packet among a series of packets of communication related to requests of various services, including a service in which, when a request related to the start (execution) of the service is received from an external device, printing is started in response to the reception of the request, is registered as the first type return packet pattern in the communicator 11. The communicator 11 according to the present embodiment includes a memory that registers a plurality of patterns of communication packets and can hold the patterns in the power-saving state. In addition to the communication related to the above-described services, there is communication that needs to be received in the power-saving state and processed by the controller 13, but communication that does not need the operation of the engine 12 is included. The controller 13 registers a pattern indicating the features of a head packet related to the pieces of communication which do not involve printing as the second type return packet pattern. Examples of the second type include a magic packet defined as a packet that sends a power-on instruction to a device connected via a network. In this manner, the controller 13 classifies head packets of the pieces of communication that need to be processed by the controller 13 among the pieces of communication to be received by the communicator 11 in the power-saving state into the first type and the second type, and registers the first type and the second type in the communicator 11 (step S75).

Then, the controller 13 stops the operation of the engine 12, serving as the engine controller 13E, stops the operation of each component of the image forming apparatus 10, sends an instruction to the power supply 14 to turn off the power to each component except for the communicator 11, and causes the image forming apparatus 10 to shift to the power-saving state (step S77).

On the other hand, in step S73 described above, when any one of the predetermined automatic printing-unnecessary services is set to be in a receivable state (No in step S73), the controller 13 registers patterns indicating the features of head packets related to all services requested from an external device, including a service that needs to automatically start printing, as the second type return packet pattern (step S79). A service that automatically starts printing is also registered as the second type return packet pattern. Then, the processing of step S77 described above is executed to cause the image forming apparatus 10 to shift to the power-saving state.

First Type and Second Type Patterns

In step S75 described above, it is stated that the controller 13 registers a pattern indicating the features of a head packet of communication related to various services, including a service in which, when a request is received from an external device, printing needs to be started in response to the reception of the request, as the first type return packet pattern in the communicator 11. More specifically, the condition is being a SYN packet of a TCP as the features of a head packet. Furthermore, the condition is being a unicast address addressed only to the IP address of the image forming apparatus 10. Therefore, any pattern registered as the first type pattern is a pattern in which a predetermined portion of a communication packet indicates a TCP protocol, another predetermined portion indicates a SYN packet, and an IP address indicated in another predetermined portion is a packet addressed to the image forming apparatus 10. A communication packet that satisfies the condition indicates the features of a head packet of communication related to a service requested from an external device. Furthermore, the first type return packet pattern is registered only when the service setting storage 13S is set to be in a state where any of the predetermined automatic printing-unnecessary services is not received. Therefore, it can be said that the first type return packet pattern indicates the features of a return packet having a high possibility of being related to a request of a service that starts printing in response to a request of starting the service.

Processing of Communicator in Power-Saving State

Figure 8:
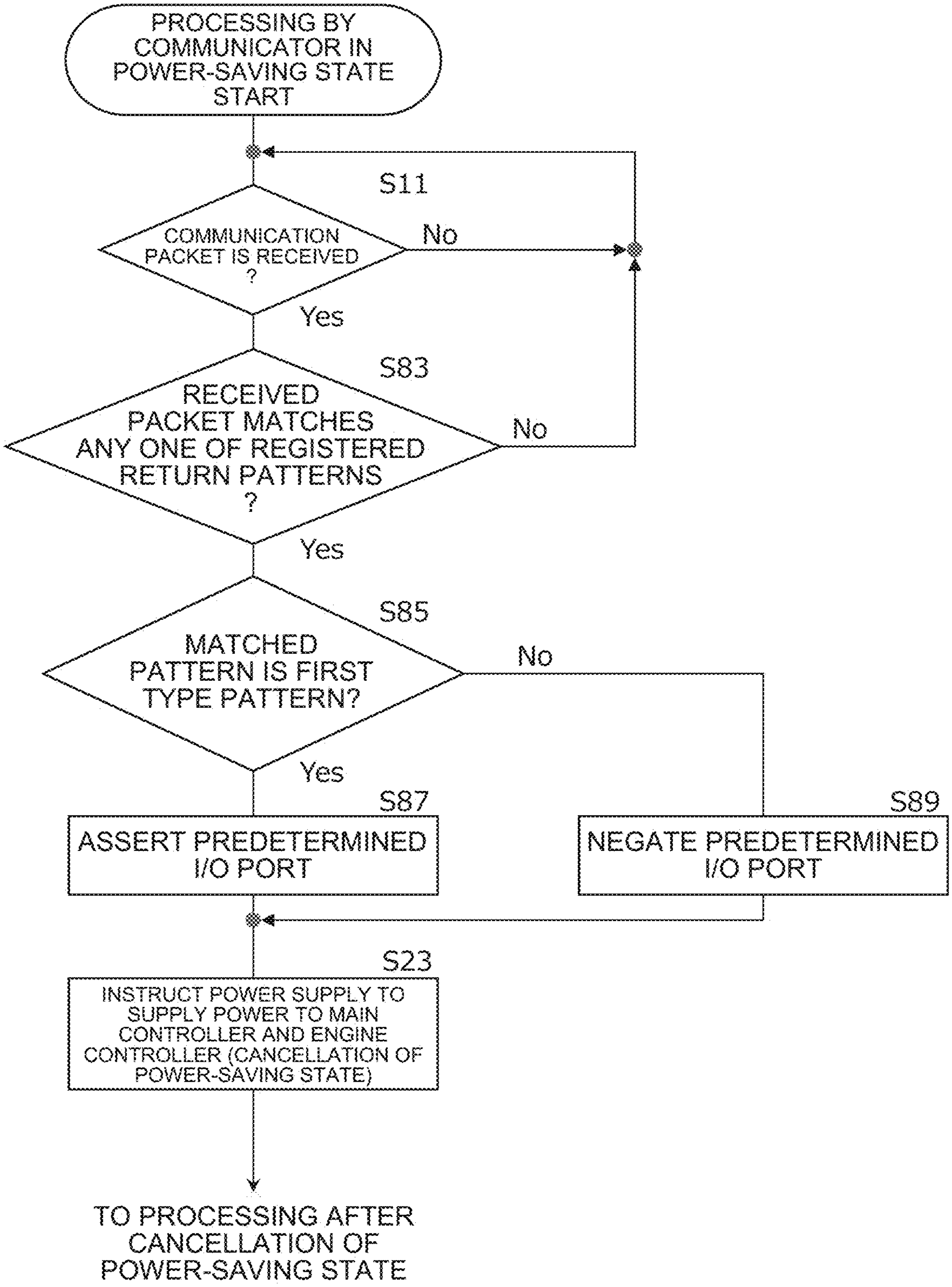
FIG. 8 is a flowchart illustrating an example of the processing related to the cancellation of the power-saving state executed by the communicator in the power-saving state in the fourth embodiment.

FIG. 8 is a flowchart illustrating an example of the processing related to the cancellation of the power-saving state executed by the communicator 11 in the power-saving state in the present embodiment, and corresponds to the flowchart of FIG. 2. The same processing as that in FIG. 2 is denoted by the same reference numeral. Processing different from that in FIG. 2 will be mainly described.

When a communication packet is received via the network 18 in the power-saving state (Yes in step S11), the communicator 11 determines whether the received packet corresponds to any one of registered patterns (step S83). The registered patterns are patterns registered by the controller 13 in the processing illustrated in FIG. 7. When the received packet does not correspond to any of the registered patterns (No in step S83), the communicator 11 returns the processing to step S11 and waits for reception of a next communication packet without performing the processing related to the cancellation of the power-saving state. On the other hand, when the received packet corresponds to any of the registered patterns (Yes in step S83), it is determined whether the attribute of the pattern corresponding to the received packet is the first type or the second type (step S85).

When the received packet does not correspond to the first type pattern (No in step S85), that is, when the received packet corresponds to the second type pattern, the communicator 11 negates a predetermined I/O port (step S89). Then, the processing proceeds to step S23, and the power supply 14 is instructed to cancel the power-saving state. On the other hand, when the received packet corresponds to the first type pattern (Yes in step S85), the communicator 11 asserts the predetermined I/O port (step S87). Then, the processing proceeds to step S23, and the power supply 14 is instructed to cancel the power-saving state.

Processing of Controller after Cancellation of Power-Saving State (at Start-Up)

Figure 9:
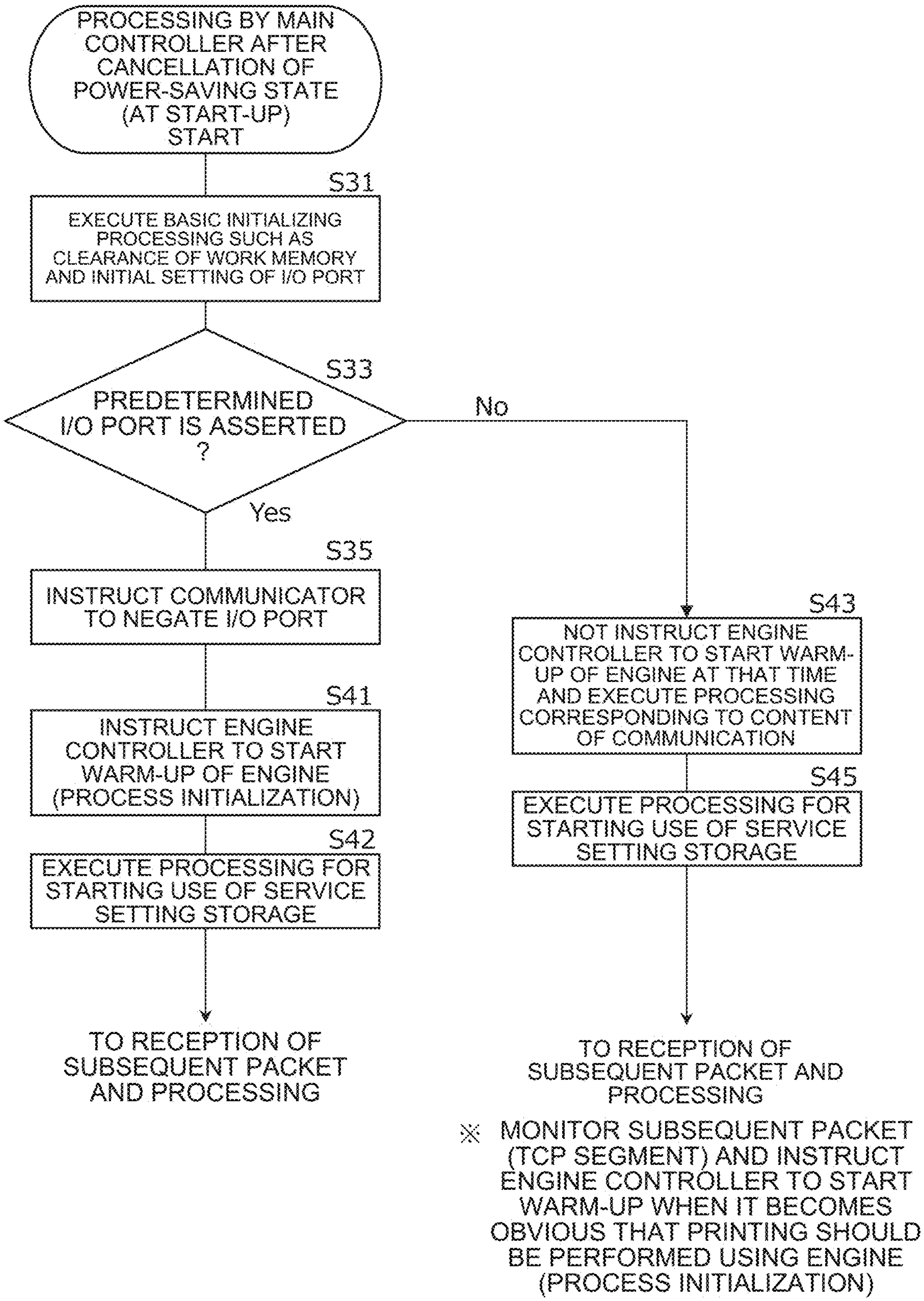
FIG. 9 is a flowchart illustrating the initial processing executed by the controller when the power-saving state is canceled and power is supplied in the fourth embodiment.

Next, processing related to the power-on of the engine 12 will be described. FIG. 9 is a flowchart illustrating processing executed by the controller 13 serving as the main controller 13M at start-up, which is processing executed by the controller 13 to which power is supplied by executing the processing of step S23 illustrated in FIG. 8 by the communicator 11, and corresponds to FIG. 5. The same processing as that in FIG. 5 is denoted by the same reference numeral as that in FIG. 5. Each piece of processing illustrated in FIG. 9 corresponds to each piece of processing of FIG. 5. However, FIG. 9 is different from FIG. 5 in that processing of steps S37 and S39 illustrated in FIG. 5 are not included in FIG. 9.

In the processing of the first and second embodiments illustrated in FIG. 5, in the processing of steps S37 and S39, the controller 13 refers to the service setting storage 13S and determines whether setting is performed so as not to receive any of the predetermined automatic printing-unnecessary services. On the basis of the determination, whether to start the warm-up of the engine 12 at this stage or whether to determine the necessity of the warm-up with reference to a subsequent packet is determined. Steps S37 and S39 are processing after the power-saving state is canceled and power is supplied to the controller 13. In the present embodiment, processing corresponding to steps S37 and S39 in FIG. 5 is executed before shifting to the power-saving state (refer to FIG. 7). The controller 13 determines, on the basis of the determination of step S33 illustrated in FIG. 9, whether to start the warm-up of the engine 12 at this stage or whether to determine the necessity of the warm-up with reference to a subsequent packet. In the determination of step S33, when the predetermined I/O port is asserted, the warm-up of the engine 12 is started at this stage. Otherwise, the necessity of the warm-up is determined with reference to a subsequent packet. The processing by the controller 13 serving as the engine controller 13E illustrated in FIG. 6 is the same in the present embodiment.

The above is the description of the present embodiment. It should be understood that the present disclosure includes combinations of any of the above-described modes. Various modifications can be made to the present disclosure in addition to the above-described embodiments. These modifications should not be construed as falling outside the scope of the present disclosure. The invention according to the present disclosure should include all modifications that are equivalent to the scope of the claims and fall within the scope of the present disclosure.

What is claimed is:

1. An image forming apparatus comprising:

a service setting storage that stores a setting related to at least one service requested from an external device;

a communicator that determines, when a communication packet is received in a power-saving state, whether the communication packet is a return packet requiring cancellation of the power-saving state;

a controller that, when the communication packet is the return packet, receives a request related to a start of the service, which is received by communication including a subsequent packet, and executes processing;

an engine that performs printing in accordance with an instruction from the controller; and a power supply that individually turns on and off power to be supplied to the controller and the engine, wherein the controller refers to the service setting storage before shifting to the power-saving state, when a request related to a start of an automatic printing-unnecessary service that is a predetermined service that does not start printing in response to the reception of the request is set not to be received in at least the power-saving state, adds a first type attribute to a pattern corresponding to a predetermined return packet and registers the pattern in the communicator, adds a second type attribute to a pattern related to another return packet and registers the pattern, and, when a request related to a start of any automatic printing-unnecessary service is set to be received, adds the second type attribute to a pattern related to any of the return packets and registers the pattern, and the communicator causes the power supply to turn on the power to the controller when the communication packet received in the power-saving state is the return packet, and sets a predetermined signal when the return packet corresponds to the first type pattern, and the controller whose power is turned on causes the power supply to turn on the power to the engine when the predetermined signal is set.

2. The image forming apparatus according to claim 1, wherein the predetermined automatic printing-unnecessary service includes, as a service that does not start printing in response to the reception of the request, at least one of reservation printing in which data from the external device is stored in a memory without being printed, a function of using the image forming apparatus as a print server, and a function of using the image forming apparatus as a network storage.

3. The image forming apparatus according to claim 1, wherein the pattern to which the controller adds the first type attribute is a pattern of a SYN packet of a transmission control protocol and a unicast communication packet addressed to an address of the image forming apparatus.

4. The image forming apparatus according to claim 1, wherein the return packet includes a magic packet and a packet for the external device in which a driver is installed to make the request related to the start of the service to the image forming apparatus.

5. An image forming apparatus comprising:

a service setting storage that stores a setting related to at least one service requested from an external device;

a communicator that determines, when a communication packet is received in a power-saving state, whether the communication packet is a return packet requiring cancellation of the power-saving state;

a controller that, when the communication packet is the return packet, receives a request related to a start of the service, which is received by communication including a subsequent packet, and executes processing;

an engine that performs printing; and a power supply that individually turns on and off power to be supplied to the controller and the engine, wherein the communicator causes the power supply to turn on the power to the controller when the communication packet received in the power-saving state is the return packet, and sets a predetermined signal when the return packet corresponds to a predetermined pattern, and the controller whose power is turned on refers to the service setting storage when the predetermined signal is set, and causes the power supply to turn on the power to the engine when a request related to a start of an automatic printing-unnecessary service that is a predetermined service that does not start printing in response to the reception of the request is set not to be received.

* * * * *